March 13, 1934.    R. HIGGINS    1,950,676
CAPACITANCE COUPLING
Filed June 24, 1932

INVENTOR
Ralph Higgins
BY Alpheus J. Crane
ATTORNEY

Patented Mar. 13, 1934

1,950,676

UNITED STATES PATENT OFFICE 1,950,676

CAPACITANCE COUPLING

Ralph Higgins, Akron, Ohio, assignor to The Ohio Brass Company, Mansfield, Ohio, a corporation of New Jersey Application June 24, 1932, Serial No. 619,009

9 Claims. (Cl. 171—119)

This invention relates to capacitance couplings for diverting energy from high potential transmission lines of the type in which a transformer is connected to the line by condensers in series with the transformer.

One object of the invention is to provide means for accurately and readily controlling the magitude and phase angle of the secondary voltage of the transformer.

A further object is to provide an installation of the class named which shall be economical and simple to manufacture and install, which may be more accurately adjustable than devices previously employed, and which shall be of improved construction and operation.

Other objects and advantages will appear from the following description.

The invention is exemplified by the combination and arrangement of parts and apparatus shown in the accompanying drawing and described in the following specification, and it is more particularly pointed out in the appended claims.

In the operation of high tension transmission systems, it is frequently desirable to divert small quantities of energy from a transmission line for the purpose of synchronizing, metering, relay operation or other functions which require relatively low voltages but which do not justify the installation of a high voltage transformer. It has been found that a low voltage transformer in series with one or more condensers may be used advantageously in many instances for these purposes. In an installation of this kind, however, the voltage across the secondary leads of the transformer will depend both in magnitude and phase angle relation to the line voltage upon the nature and amount of the burden supplied by the secondary of the transformer. In most instances it is desirable to supply the burden with a definite voltage, usually 110 volts or 63.5 volts, and it is also desirable in some instances that the installation be adjustable to supply voltages at either of these values or the other values.

It is also frequently desirable that the voltage on the burden shall have a definite phase angle relation to the voltage between the transmission line and ground. The particular phase angle relation desired depends upon the purpose for which the installation is being used. If, for instance, the connection is used for synchronizing with another line having a similar connection, the phase angle relation is not important since both connections, if alike, will have the same relation to their respective transmission lines. If, however, the connection is used for synchronizing with another line provided with a high potential stepdown transformer, then the phase angle relation supplied by the capacitance coupling and low potential transformer should be the same as that supplied by the high potential transformer. In most relay installations, also, a definite phase angle relation is necessary.

Figure 1:
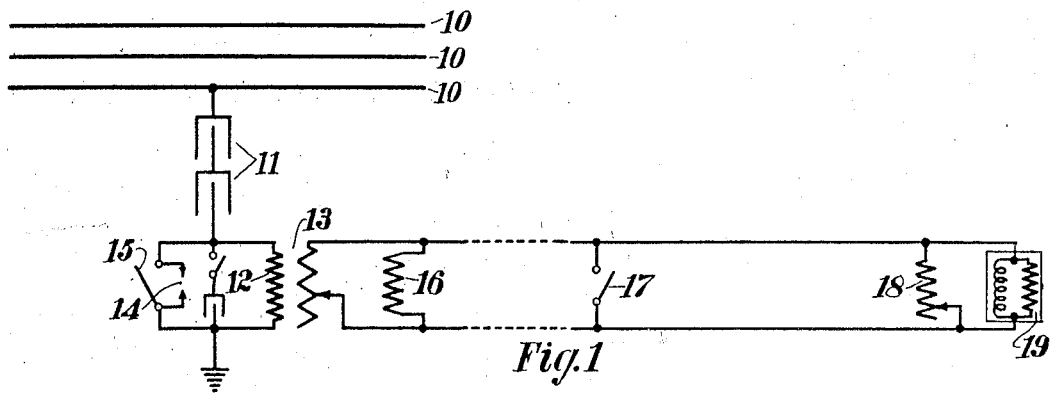
Figs. 1, 2 and 3 are circuit diagrams showing different embodiments of the invention.

The manner in which the desired results are secured by the present invention will best be understood from the description of the invention taken in connection with the accompanying drawing. In Fig. 1 the numerals 10 designate three conductors of a polyphase transmission line, one or more of which is connected through condensers 11 to the primary winding 12 of transformer 13. One form of condenser suitable for this purpose is described in U. S. Patent #1,810,385. These condensers are commonly manufactured in units of .001 microfarads and are readily connected in series to provide suitable connection for any desired voltage. Usually one unit is used for each 33 kilovolts of the high potential line. The current which flows through the primary 12 is of course the charging current for the condensers 11 and is relatively small, and the transformer is primarily for the purpose of stepping up this current to values which may be practically employed for operating the various instruments for which the installation is used. Since practically any desired voltage may be obtained, this may be readily done. Of course, at the same time that the current is stepped up, the voltage is stepped down so that the transformer may be regarded as a current transformer for stepping up the current or as a voltage transformer for reducing the voltage.

The amount of current flowing through the condensers depends upon the frequency so that, although for normal frequencies, the current is small, some means must be provided for protecting the transformer from excessive voltage when the line is subjected to abnormally high frequencies or surges having a steep wave front, such as are produced by lightning. This is readily done by providing an arcing gap 14 in parallel with the primary of the transformer. A switch 15 is also provided for short-circuiting the primary to permit manipulation of the secondary circuit without danger.

A large proportion of the voltage drop between the conductor 10 and ground is cared for by the condensers 11 at normal frequencies and the voltage drop across the primary 12 of the transformer will have a large phase angle displacement from that across the condensers so that variations in the voltage of the transformer, due to variations in load on the secondary, will have but slight effect upon the total current flowing in the transformer primary. The voltage on the secondary will therefore depend upon the secondary load and will increase as the secondary impedance increases, and vice versa.

To keep the voltage down to the desired values, a fixed resistance 16 is connected across the secondary terminals and may be enclosed in the same housing with the transformer windings. 500 ohms has been found to be a suitable value for this resistance for general purposes. This resistance takes up some of the excess output in watts not used by the useful burden. Also, since the step-down transformer is similar to a current transformer in function, this resistance always provides a load on the transformer and prevents an excessive rise in voltage across its terminals in case the low tension circuit is opened. In case the burden itself requires most of the available output or when the high tension line is to be operated much below normal, this resistance may be disconnected. A small shorting switch 17 is connected across the low tension leads and may be used to allow the operator to make necessary changes and adjustments.

Since the output voltage on a potential device of this kind for any definite high tension line voltage depends upon the total volt ampere load or burden on the secondary, this voltage may be regulated and adjusted to a normal potential of 110 volts or other desired value by means of a variable resistance 18 in parallel with the burden 19. The phase angle of the output voltage with respect to the transmission line voltage also depends upon the reactive volt-amperes in the total burden. For any given coupling condenser and transformer combination, it is possible to plot a curve showing reactive volt amperes and watts output at constant secondary voltage in the secondary load corresponding to the various possible phase angle relations of the secondary to the primary voltage. From such a curve it is a simple matter to determine supplemental loading necessary to be used in connection with any given useful burden.

Figure 4:
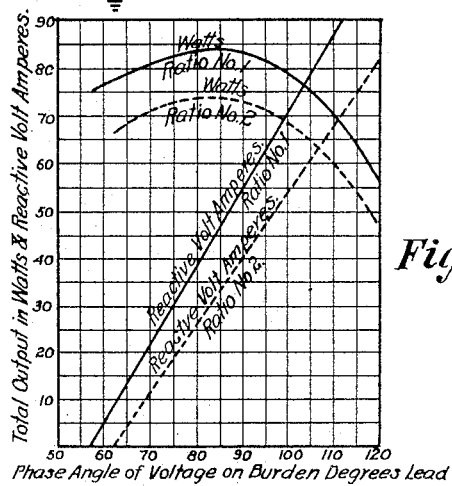
Fig. 4 is a graphic diagram used in the practice of the invention.

Fig. 4 shows two sets of such curves for the installation shown in Fig. 1 with the resistance 16 properly connected in the circuit; the curves in solid lines being for one ratio adjustment of the transformer, and the curves in broken lines for another ratio adjustment. Assume that it is desired to connect a load to the secondary of the transformer in Fig. 1, adjusted to the ratio corresponding to the solid line curves of Fig. 4, the load requiring 20 volt amperes at 110 volts and at a power factor of 75%, the wattage component of this burden will then be 20×.75=15 watts. The reactive component will be $$\sqrt{20^2-15^2}=13.3 \text{ volt amperes}$$

From the solid line curve of Fig. 4, it will be seen that 13.3 reactive volt amperes corresponds to a phase angle lead of 65° and that to get this relation, the total load should be 80 watts. Since 15 watts of this output is taken by the useful burden, then 80—15 or 65 watts must be absorbed by a supplemental resistance to maintain 110 volts on the burden. Hence, from this data, the approximate setting of the resistance 18 may be computed. Where a voltmeter is used as part of the useful burden, it is generally more convenient to adjust the resistance 18 so as to give the proper voltage indication while the condenser stack is energized. In making this adjustment, the operator should start with a low setting of the resistance 18 in order to maintain a voltage on the step-down transformer within safe limits. It will be apparent from an inspection of the two sets of curves in Fig. 4 that for any particular loading of the secondary of the transformer, the phase angle of the secondary voltage will differ for the different adjustments of the transformer ratio. From this it will be seen that the phase angle can be controlled by adjusting the transformer ratio. This does not require a departure from the desired voltage since the voltage can be controlled by the adjustable resistance 18.

The connection shown in Fig. 1 can be used on installations where fine regulation of the phase angle is not essential or where a certain connection can be made on the step-down transformer that will give the desired phase angle for a burden having certain reactive voltampere requirements. Where more accurate regulation of the phase angle is desired and where the voltage of the secondary is leading relative to that of the line from 30 to 120 degrees, the connection shown in Fig. 2 may be employed.

Figure 3:
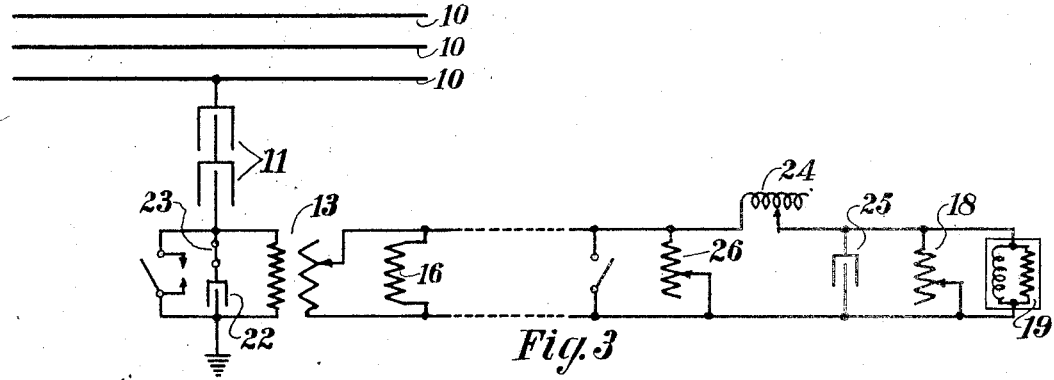

The addition of the adjustable inductance 20 in series with the adjustable resistance 21 makes the fine adjustment of the phase angle relation possible. A condenser 22 may be placed inside the current transformer housing between the condensers 11 and ground so that it is in parallel with the primary of the transformer. This condenser may be provided with a switch 23 so that it may be cut in and out of the circuit. When the condenser 22 is connected the resultant phase angle lead is reduced, whereas the addition of the inductive reactance 20 tends to increase the phase angle lead because of the reactive volt ampere burden which it places upon the secondary.

Where a certain phase angle is desired and where the characteristics of the useful burden are known, the reactive volt amperes in the supplemental secondary burden can be ascertained from the proper curve, similar to that shown in Fig. 4, corresponding to the particular coupling set-up being used. The current passing through the reactance 20 may be regulated by the resistance 21 to secure the desired reactive load and, at the same time, the resistance 18 may be adjusted to produce the desired voltage.

Where a phase angle of 30° or less is desired, the connection shown in Fig. 3 may be used. In this case an inductive reactance 24 is connected in series with the burden and a condenser 25 is used in parallel with the burden, and an adjustable resistance 26 is connected across the low tension leads instead of, or in addition to, the fixed resistance 16 in the transformer housing. Also, the switch 23 is closed to connect the condenser 22 in parallel with the primary of the transformer 13. In this case the condensers 22 and 25, the impedances 24 and the resistance 26 all act to decrease the phase angle difference between the voltage on the burden and the voltage from line to ground, and it has been found in practice that where desired the two voltages may be brought accurately into phase with each other.

In installations where part of the useful burden is frequently cut in and out, as in the case of synchroscopes, voltmeters and frequency meters, a dummy burden may be provided which can be substituted for the part of the useful burden cut out of the circuit. A suitable switch may be provided for automatically cutting in the dummy burden when the useful burden is cut out. This arrangement may be used in connection with all three circuits illustrated.

The small condenser 22 connected across the primary winding, together with the resistance 16 connected across the secondary winding, both of which may be placed inside the transformer tank, will in most cases be sufficient to prevent excessive rise in voltage, should the low tension leads to the burden be open circuited. If the resistance 16 is made low enough to take care of open circuits alone, it may in some cases absorb too much of the transformer output so as not to leave enough output for the useful burden. If the condenser 22 is made large enough to take care of open circuits in the secondary, it also may absorb too much of the transformer output. By using the two in combination, however, it has been found possible to provide for open circuits of the secondary without materially impairing the operation. When the condenser 22 is not too large, it may be left in the circuit at all times, in which case it is possible to obtain practically any desired phase angle by the use of this condenser in combination with the variable reactance 20 or 24. In some cases it may be advantageous to have this condenser include one or more units so that it may be adjusted to vary its capacity for different conditions.

Figure 2:
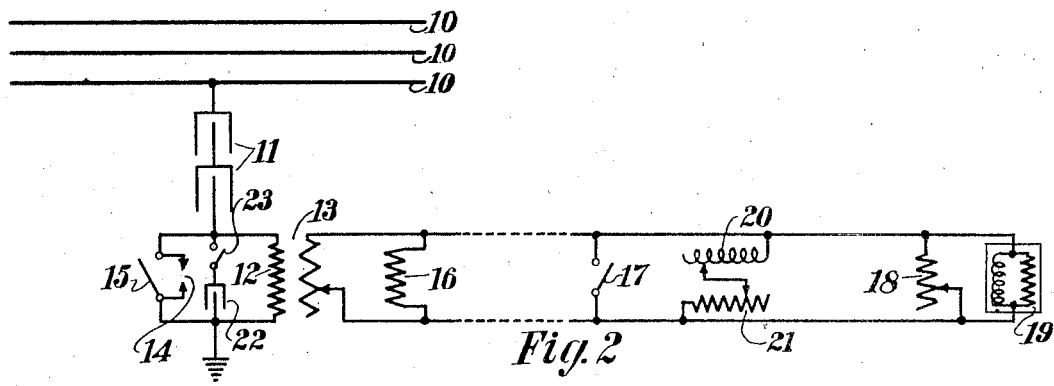

With the connections shown in Figs. 2 and 3, only rough adjustments of the reactance coils 20 and 24, the transformer ratio and the capacity members is required to obtain the desired magnitude and phase angle of the secondary voltage since fine adjustment of the voltage may be obtained by the resistance 18, and fine adjustment of the phase angle may be obtained by the adjustable resistance 21 or 26. In many cases it is possible to use fixed elements for all of the units except the resistances 18, 21 and 26, which in themselves will be sufficient to obtain the necessary adjustments. Although it may be desirable in most cases to mount the resistance 16 and the condenser 22 inside the transformer tank, these elements may of course be mounted elsewhere if desired.

The net-work shown in Fig. 3 does not depend upon the existence of a circuit tuned to the power frequency for bringing the voltage on the translating device, constituting the useful burden, into phase with the primary voltage, and in fact one function of the resistances 16, 18 and 26 is to prevent the flow of excessive currents and the development of dangerous voltages, should resonance occur in any port of the net-work. With an arrangement similar to that shown in Fig. 3, it would be possible to obtain a small phase angle difference or a zero phase angle difference between the burden voltage and the primary voltage without the resistances 16 and 26, but where this is done, it often happens that some of the inductive reactances and capacities of the circuit will be in resonance with each other at the normal line frequency or at some harmonic of the normal line frequency, and this often results in an over-potential on the step-down transformer. Due to this over-potential and the consequent oscillations set up by the continued arcing of the protective gap, this condition, if allowed to persist, would be dangerous to the insulation of the transformer. Also, such a circuit without the resistance is apt to be unstable and any oscillation in one part of the circuit caused, for example, by an arc on the protective gap 14, due to a surge on the high tension line, may cause another part of the circuit to oscillate at its own natural period or frequency. The effect of the resistances 16, 18 and 26 is to dampen out any such oscillations and to prevent dangerous over-voltage due to resonance. The resistance 18 also tends to stabilize the circuit should the inductive reactance component of the burden be in resonance with the capacity 25 or any other portion of the circuit.

The voltage, the magnitude and phase relation of which, with respect to the primary, it is desired to control is that across the burden 19. Elements in this control are resistances 18 and 26, condenser 25 and reactance 24, of Fig. 3. It is desirable that the voltage drop across reactance 24 be comparable in magnitude with that across the burden 19 and that it lead the voltage across burden 19 by a large angle. The magnitude of the voltage drop across 24 is obtained by properly proportioning the size of reactance 24 with respect to the current drawn by 18, 19 and 25. This is most simply accomplished by providing a tapped winding for reactance 24. The proper leading relationship is secured by making condenser 25 of a size such that the current which it draws is comparable in magnitude with the vector sum of the currents drawn by 18 and 19.

Current drawn by resistance 18 must pass through the reactance 24. Since the magnitude of reactance 24 is great, any variation in the current 18 will effect a change in the voltage drop across 24 which is large relative to voltage across 19. The result is that, due to the size of reactance 24, any change in magnitude of the current in 18 has a relatively large effect upon the magnitude and phase position of voltage across 19.

The combination of reactance 24 and condenser 25 causes the transformer secondary E. M. F. across 26 and 16 to lead the E. M. F. across 19 by a large angle. As a result, the current in resistance 26 leads that in resistance 18 by the same angle. There are thus obtained two currents in 18 and 26 respectively, adjustable in magnitude and differing in phase angle from one another by a large amount which may be in the order of seventy degrees. By varying these two currents in opposite senses, it is possible, if desired, to change the phase angle of their vector sum through nearly ninety degrees without changing its magnitude. The proportion of voltage drop through condensers 11, through which this component current passes, is thus unchanged in magnitude but shifted in phase position. This has a corresponding influence on the phase position of the transformer secondary voltage, which effect is further transmitted to the burden voltage across 19, which it is desired to control.

The ultimate purpose is to bring burden voltage across 19 into phase with the primary voltage to ground which constitutes the primary source of voltage. The largest step in this is accomplished through the use of reactance 24 and condenser 25. Exact adjustment is then secured through resistances 18 and 26; the current in 18 affecting the reactance voltage across 24 in amount and phase, and the vector sum of currents in 18 and 26 affecting the voltage drop through condensers 11, in phase only or in amount and phase as desired.

I claim:

1. Means for diverting energy from a high potential transmission line comprising a condenser, a transformer having its primary winding connected to the transmission line in series with the condenser, a useful burden connected to the secondary of the transformer, and means for controlling the magnitude and phase angle relation of the voltage impressed on said useful burden to bring said voltage into the desired magnitude and phase angle relation to the voltage of said line without danger of resonance, said means comprising a reactance in the secondary circuit of said transformer for controlling the phase angle relation of the voltage impressed on said burden to the voltage of said line, and an adjustable resistance for controlling the portion of the current in said secondary circuit which passes through said reactance.

2. Means for diverting energy from a high potential transmission line comprising a condenser, a transformer having its primary winding connected to the transmission line in series with the condenser, a useful burden connected to the secondary of the transformer, and means for controlling the magnitude and phase angle relation of the voltage impressed on said useful burden to bring said voltage into the desired magnitude and phase angle relation to the voltage of said line without danger of resonance, said means comprising an inductive reactance in the secondary circuit of said transformer, and an adjustable resistance in said secondary circuit for making close adjustments of the phase angle of the voltage impressed on said burden.

3. Means for diverting energy from a high potential transmission line comprising a condenser, a transformer having its primary winding connected to the transmission line in series with the condenser, a useful burden connected to the secondary of the transformer and means for controlling the magnitude and phase angle relation of the voltage impressed on said useful burden to bring said voltage into the desired magnitude and phase angle relation to the voltage of said line without danger of resonance, said means comprising a reactance in the secondary circuit of said transformer for controlling the phase angle of the voltage impressed on said burden, an adjustable resistance in said circuit for making close adjustments of the phase angle of the voltage impressed on said burden, and an adjustable resistance in parallel with said burden for controlling the magnitude of the voltage impressed on said burden.

4. Means for diverting energy from a high potential transmission line comprising a condenser, a transformer having its primary winding connected to the transmission line in series with the condenser, a useful burden connected to the secondary of the transformer and means for controlling the magnitude and phase angle relation of the voltage impressed on said useful burden to bring said voltage into the desired magnitude and phase angle relation to the voltage of said line without danger of resonance, said means comprising a reactance in parallel with said burden for controlling the phase angle of the voltage impressed on said burden, and an adjustable resistance in series with said reactance for controlling the amount of current passing through said reactance to secure close adjustment of the phase angle of the voltage impressed on said burden.

5. Means for diverting energy from a high potential transmission line comprising a condenser, a transformer having its primary winding connected to the transmission line in series with the condenser, a useful burden connected to the secondary of the transformer, and means for controlling the magnitude and phase angle relation of the voltage impressed on said useful burden to bring said voltage into the desired magnitude and phase angle relation to the voltage of said line without danger of resonance, said means comprising a reactance in parallel with said burden for controlling the phase angle of the voltage impressed on said burden, and an adjustable resistance in series with said reactance for controlling the amount of current passing through said reactance to secure close adjustment of the phase angle of the voltage impressed on said burden, and an adjustable resistance in parallel with said burden for controlling the magnitude of the voltage impressed on said burden.

6. Means for diverting energy from a high potential transmission line comprising a condenser, a transformer having its primary winding connected to the transmission line in series with the condenser, a useful burden connected to the secondary of the transformer and means for controlling the magnitude and phase angle relation of the voltage impressed on said useful burden to bring said voltage into the desired magnitude and phase angle relation to the voltage of said line without danger of resonance, said means comprising a reactance in series with said burden for controlling the phase angle of the voltage impressed on said burden, and an adjustable resistance in said secondary circuit for controlling the portion of the current in said circuit passing through said reactance to secure close adjustment of the phase angle of the voltage impressed on said burden.

7. Means for diverting energy from a high potential transmission line comprising a condenser, a transformer having its primary winding connected to the transmission line in series with the condenser, a useful burden connected to the secondary of the transformer and means for controlling the magnitude and phase angle relation of the voltage impressed on said useful burden to bring said voltage into the desired magnitude and phase angle relation to the voltage of said line without danger of resonance, said means comprising an inductive reactance in series with said burden for controlling the phase angle of the voltage impressed on said burden, and an adjustable resistance in shunt with the circuit comprising said reactance and burden for making close adjustments of the phase angle impressed on said burden.

8. Means for diverting energy from a high potential transmission line comprising a condenser, a transformer having its primary winding connected to the transmission line in series with the condenser, a useful burden connected to the secondary of the transformer and means for controlling the magnitude and phase angle relation of the voltage impressed on said useful burden to bring said voltage into the desired magnitude and phase angle relation to the voltage of said line without danger of resonance, said means comprising an inductive reactance in series with said burden for modifying the phase angle of the voltage impressed on said burden, a condenser in shunt with said burden for modifying the effect of the inductance of said burden, and an adjustable resistance in shunt with the circuit comprising said inductive reactance and said burden, for making close adjustments of the phase angle of the voltage impressed on said burden.

9. Means for diverting energy from a high potential transmission line comprising a condenser, a transformer having its primary winding connected to the transmission line in series with the condenser, a useful burden connected to the secondary of the transformer and means for controlling the magnitude and phase angle relation of the voltage impressed on said useful burden to bring said voltage into the desired magnitude and phase angle relation to the voltage of said line without danger of resonance, said means comprising an inductive reactance in series with said burden, a condenser in shunt with said burden, an adjustable resistance in parallel with the circuit comprising said reactance and said burden for securing close adjustment of the phase angle of the voltage impressed on said burden, and a second adjustable resistance in shunt with said burden for controlling the magnitude of the voltage impressed on said burden.

RALPH HIGGINS.